US012668534B2

(12) United States Patent (10) Patent No.: US 12,668,534 B2
Fourcade et al. (45) Date of Patent: Jun. 30, 2026

(54) HEAT-RESISTANT PRODUCT

(71) Applicant: SAINT-GOBAIN CENTRE DE RECHERCHES ET D'ETUDES EUROPEEN, Courbevoie (FR)

(72) Inventors: Julien Fourcade, Cavaillon (FR); Marielle Thibault, Cavaillon (FR); Audrey Durand, Dordives (FR); Cédric Frot, Souppes/Loing (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 236 days.

(21) Appl. No.: 18/290,918

(22) PCT Filed: Jul. 21, 2022

(86) PCT No.: PCT/EP2022/070511
§ 371 (c)(1),
(2) Date: Jan. 22, 2024

(87) PCT Pub. No.: WO2023/001971
PCT Pub. Date: Jan. 26, 2023

(65) Prior Publication Data
US 2024/0327281 A1     Oct. 3, 2024

(30) Foreign Application Priority Data
Jul. 22, 2021    (FR) ...................................... 2107935

(51) Int. Cl.
| | |
|---|---|
| *C03C 25/002* | (2018.01) |
| *C03C 25/1095* | (2018.01) |
| *C03C 25/42* | (2006.01) |
| *C03C 25/47* | (2018.01) |
| *C03C 25/54* | (2006.01) |
| *C09D 1/00* | (2006.01) |

(52) U.S. Cl.
CPC ........ *C03C 25/002* (2013.01); *C03C 25/1095* (2013.01); *C03C 25/42* (2013.01); *C03C 25/47* (2018.01); *C03C 25/54* (2013.01); *C09D 1/00* (2013.01)

(58) Field of Classification Search
CPC ... C03C 25/002; C03C 25/47; C03C 25/1095; C03C 25/42
See application file for complete search history.

(56) References Cited

U.S. PATENT DOCUMENTS

| | | | | |
|---|---|---|---|---|
| 3,013,903 | A | * | 12/1961 | Bugosh .................. D06M 11/45 |
| | | | | 442/72 |
| 2019/0284734 | A1* | | 9/2019 | Huang ................. D03D 15/242 |
| 2020/0224341 | A1* | | 7/2020 | Harada ................ D03D 15/573 |
| 2022/0041501 | A1 | | 2/2022 | Hamakubo |
| 2022/0066095 | A1 | | 3/2022 | Hamakubo et al. |

FOREIGN PATENT DOCUMENTS

| | | |
|---|---|---|
| CN | 103787593 | 8/2016 |
| KR | 100910240 | 7/2009 |

OTHER PUBLICATIONS

International Search Report dated Oct. 7, 2022.

* cited by examiner

*Primary Examiner* — Nathan T Leong
(74) *Attorney, Agent, or Firm* — IPSILON USA, LLP

(57) ABSTRACT
A process is provided for a heat-resistant product that has a support chosen from a glass fiber and an assembly of glass fibers, and
a coating extending over the outer surface of said support, in a zone called the "protected zone." The coating has particles having a mean size of less than 100 nm and has more than 95% by mass of $Al_2O_3$ and/or $ZrO_2$, referred to as "protective particles." The protective particles cover more than 50% and less than 90% of the protected zone, as percentage by surface area. The process includes the step of subjecting the heat-resistant product to a temperature of greater than 600° C. for a duration of greater than 0.5 hours.

15 Claims, No Drawings

HEAT-RESISTANT PRODUCT

RELATED APPLICATION:

This application is a National Phase of PCT/EP2022/070511 filed on Jul. 21, 2022, which claims the benefit of priority from French Patent Application No. 21 07935 filed on Jul. 22, 2021, the entirety of which are incorporated by reference.

TECHNICAL FIELD

The invention relates to a heat-resistant product and to a process for manufacturing such a heat-resistant product.

PRIOR ART

Glass fibers and yarns are conventionally used in applications in which they are subjected to elevated temperatures, typically of greater than 400° C., for significant durations, for example of greater than 100 hours. These fibers and yarns can be used in particular for manufacturing heat shields, in particular in aeronautics, as mechanical reinforcement elements, or in data transmission systems, in particular as optical fibers.

Exposure to these severe thermal stresses degrades their mechanical properties and reduces their service life.

There is therefore a need to increase this service life.

The present invention is targeted at meeting this need, at least partially.

SUMMARY OF THE INVENTION

According to the invention, this aim is achieved by means of a heat-resistant product consisting of:

- a support chosen from a glass fiber and an assembly of glass fibers,
- a coating extending over the outer surface of said support, in a zone called the "protected zone", said coating comprising particles having a mean size of less than 100 nm and comprising more than 95% by mass of $Al_2O_3$ and/or $ZrO_2$, referred to as "protective particles", the protective particles covering more than 50% and less than 90% of the protected zone, as percentage by surface area.

Surprisingly, the inventors have discovered that a heat-resistant product according to the invention has an increased service life in an application in which it is subjected to severe thermal stresses. In particular, the mechanical strength after exposure at 800° C. for 100 hours is improved by the presence of interstices between the protective particles at the outer surface of the support.

The heat-resistant product according to the invention may also comprise one or more of the following optional and preferred features:

- the support is in the form of an optical fiber, a single yarn, an assembled yarn, a felt, a web, a knit, a ribbon, a braid or a woven fabric (i.e. a woven textile);
- the support is in the form of a woven fabric consisting of a network of parallel warp yarns and weft yarns transversely crossing said network, at least some, and preferably all, of the warp and/or weft yarns being heat-resistant products according to the invention;
- the glass fibers constituting the support consist of a material having an $SiO_2$ content of greater than or equal to 55%, as percentage by mass based on the oxides of the support;

- the glass fibers constituting the support consist of a material having, as percentages by mass based on the oxides:
- an $SiO_2$ content of greater than 90% and an $Al_2O_3$ content of greater than 0.1% and less than 5%, oxides other than $SiO_2$ and $Al_2O_3$ constituting the remainder to 100%, or
- an $SiO_2$ content of less than 79.9%, an $Al_2O_3$ content of greater than 12.5% and less than 32%, and an MgO content of greater than 4% and less than 20%, oxides other than $SiO_2$, $Al_2O_3$ and MgO constituting the remainder to 100%, or
- an $SiO_2$ content of greater than 99.9%;
- the total surface area of the interstices present in the protected zone between the protective particles and having a size of greater than 250 nm represents less than 50% of the total surface area of the interstices of said protected zone, as percentage by surface area;
- the protected zone represents more than 50% of the outer surface area of the support;
- the protective particles cover more than 75% and/or less than 85% of the protected zone, as percentage by surface area;
- the coating comprises, as percentage by mass based on the total mass of the coating, more than 60% protective particles;
- the mean size of the protective particles is greater than 10 nm and less than 70 nm;
- the coating comprises a dry binder comprising
- an organic film former in an amount, as percentage by mass based on the mass of the coating, of greater than 0.3% and less than 57%, and/or
- an organic coupling agent in an amount, as percentage by mass based on the mass of the coating, of greater than 0.1% and less than 35%, and/or
- an organic constituent other than the film former and the coupling agent and chosen from a lubricant, a surfactant, an emulsifier, a wetting agent and mixtures thereof, in an amount, as percentage by mass based on the mass of the coating, of greater than 0.05% and less than 34%;
- the heat-resistant product comprises a layer at least partially covering the coating, said layer comprising one or more materials chosen from:
- a polyvinyl alcohol,
- a paraffin,
- a polytetrafluoroethylene,
- a polymethyl methacrylate,
- a polyurethane,
- a latex,
- a resin, preferably an epoxy resin,
- an organic material capable of constituting a dry binder of said coating,
- when the coating comprises a dry binder, preferably said dry binder.

The invention also relates to a process for manufacturing a heat-resistant product according to the invention, comprising the following steps 1) to 3):

1) preparing the support and a suspension comprising a liquid binder and the protective particles;
2) applying said suspension to the support;
3) drying so as to transform the suspension into a coating having a solid form.

Lastly, the invention relates to the use of the heat-resistant product in an application in which it is subjected to a temperature of greater than 400° C., greater than 500° C., greater than 600° C., greater than 700° C., greater than 800° C., or even greater than 900° C., for a duration of greater than 0.5 hours, preferably greater than 1 hour, preferably greater than 10 hours, preferably greater than 50 hours, preferably greater than 100 hours.

DEFINITIONS

A "fiber" is a filament of which the length is greater than 5 times its equivalent diameter.

The "equivalent diameter" of a fiber is the diameter of a disk having the same surface area as its cross section at mid-length.

An assembly of fibers may be primary, secondary or tertiary. In a primary assembly, the fibers are assembled in a disordered manner, such as in a felt or a paper, or along a preferential direction, such as in a single yarn. A secondary assembly is an assembly of a plurality of primary assemblies, and optionally fibers not incorporated in said primary assemblies. An assembled yarn or a textile of single yarns are examples of secondary assemblies. A tertiary assembly is an assembly of a plurality of secondary assemblies, and optionally primary assemblies and/or fibers not incorporated in said primary and secondary assemblies. An example of a tertiary assembly is a textile of assembled yarns.

A "single yarn" is an assembly of fibers which, in cross section, comprises more than 10 and preferably less than 500 000 fibers, and the length of which is greater than 5 times the diameter.

An "assembled yarn" is an assembly of single yarns which, in cross section, preferably comprises more than 2 and preferably less than 500 single yarns.

A textile may be:
an organized structure of glass yarns, these being single or assembled, in particular a knit, a braid, a woven fabric, or
a random structure of glass yarns, these being single or assembled, for example a web, and/or of fibers not incorporated in the form of glass yarns, said random structure possibly being for example a paper or a felt, a random structure not being preferred.

The "outer surface" of a support is conventionally the surface exposed to the external environment of the support, for example the ambient air. For example, in a woven fabric, the zones of contact between the warp and weft yarns do not form part of the outer surface of the support. If the support consists of multiple superimposed woven fabrics, the faces of these woven fabrics applied one against the other also do not take part in the definition of the outer surface of the support.

All or part of the outer surface may be covered by the coating. In particular, when the support is a flat textile, and therefore comprises two large faces, it is possible for only one of the large faces to be coated.

The term "protected zone" refers to the part of the outer surface of the support that is coated with the coating. The protected zone may consist of the entire outer surface of the support.

In the protected zone, the protective particles do not form a continuous layer, but leave interstices remaining at least between some of them.

The term "covered surface" refers to the outer surface of the support which is masked by protective particles. When the protective particles do not overlap, the surface covered is therefore the sum of the surfaces of the protective particles in contact with the outer surface of the support. The protected zone therefore consists of the covered surface and the interstices between protective particles. The surface of the interstices, which may be covered, at least in part, by dry binder, is not included in the surface covered by the protective particles.

According to the invention, these interstices represent more than 10% of the protected zone, as percentage by surface area.

The size of a protective particle is the diameter of the disk having the same surface area as said particle.

The "mean size" of an assembly of protective particles refers to the arithmetic mean of the sizes of these particles.

It can be measured on images taken with a scanning electron microscope. It can also be estimated on images taken with a scanning electron microscope, for example using the "Local Thickness" function of the ImageJ software.

The size of an interstice is the diameter of the disk having the same surface area as said interstice.

The particles may be the individual elements of a powder, but also, by extension, these elements within the coating. The process of manufacturing the coating does not substantially alter the dimensions of the protective particles.

Unless stated otherwise, all oxide contents are percentages by mass based on the oxides. A content by mass of an oxide of a metallic element refers to the total content of this element expressed in the form of the most stable oxide, in accordance with the standard industry convention.

A sum of oxide contents does not imply the presence of all of these oxides. For example, "$Al_2O_3+ZrO_2$" is the sum of the contents of $Al_2O_3$ and of $ZrO_2$, but does not rule out the absence of one of these oxides.

The term "debindering" is understood to mean the at least partial removal of the dry binder.

"Include" or "comprise" or "have" should be interpreted in a nonlimiting manner.

The terms "yarn according to the invention", "fiber according to the invention" and "textile according to the invention" are understood to mean a heat-resistant product according to the invention in the form of a yarn, a fiber and a textile, respectively.

Unless otherwise stated, all means are arithmetic means.

DETAILED DESCRIPTION

Heat-Resistant Product

The heat-resistant product according to the invention comprises, and preferably consists of:
a support,
a coating comprising the protective particles and extending over the surface of the support, and
optionally an organic layer.

Preferably, the protective particles cover more than 55%, preferably more than 60%, preferably more than 65%, preferably more than 70%, preferably more than 75% and/or less than 85% of the protected zone of the support, as percentage by surface area, said particles preferably being chosen from particles comprising more than 95% by mass of $Al_2O_3$ and/or $ZrO_2$.

Support

The support may be a unitary fiber or an assembly of fibers, for example a single yarn, a felt or a paper, or an assembly of yarns, for example an assembled yarn, a web or a woven fabric, for example a woven fabric of single yarns and/or assembled yarns, or a braid.

In one embodiment, the yarns of the support themselves comprise, and are preferably composed of, heat-resistant products according to the invention, in particular fibers and/or yarns according to the invention.

In a first embodiment, the support is in the form of a fiber and, in one embodiment, is an optical fiber.

In a first variant, the fiber has:

a length of greater than 10 mm; and an equivalent diameter, measured at mid-length, of greater than 2 μm, preferably greater than 4 μm and/or preferably less than 50 μm, preferably less than 30 μm, preferably less than 20 μm.

In a second variant, the fiber has:

a length of less than or equal to 10 mm; and an equivalent diameter, measured at mid-length, of greater than 2 μm, preferably greater than 4 μm and/or preferably less than 50 μm, preferably less than 30 μm, preferably less than 20 μm.

In a third variant, the fiber, preferably an optical fiber, has:

a length of greater than 10 mm, preferably greater than 50 mm, preferably greater than 100 mm; and an equivalent diameter, measured at mid-length, of greater than 30 μm, preferably greater than 40 μm, or even greater than 50 μm, or even greater than 80 μm, or even greater than 100 μm and/or preferably less than 300 μm, preferably less than 200 μm.

In a second embodiment, the support is in the form of an assembly of fibers, preferably chosen from a felt or a paper.

More than 90%, preferably more than 95%, by number of the fibers of the assembly may in particular be in accordance with one or more of the three variants of the first embodiment and/or be glass fibers, in particular according to the prior art. All or some of the fibers of the assembly may themselves be heat-resistant products according to the invention. Preferably, more than 85%, preferably more than 90%, preferably more than 95%, preferably 100% by number of the fibers are heat-resistant products according to the invention.

In one embodiment, the assembly comprises, over more than 85%, preferably more than 90%, preferably more than 95% of the thickness of said assembly, fibers which themselves are heat-resistant products according to the invention.

In a third embodiment, the support is in the form of a yarn.

In a first variant, the yarn:

has a length of greater than 10 mm; and is an assembly of fibers having an equivalent diameter, measured at mid-length, of greater than 2 μm, preferably greater than 4 μm and/or preferably less than 50 μm, preferably less than 30 μm, preferably less than 20 μm.

In a second variant, the yarn:

has a length of less than or equal to 10 mm; and is an assembly of fibers having an equivalent diameter, measured at mid-length, of greater than 2 μm, preferably greater than 4 μm and/or preferably less than 50 μm, preferably less than 30 μm, preferably less than 20 μm.

In a fourth embodiment, the support is in the form of an assembly of yarns, preferably a textile, preferably essentially consisting of an ordered arrangement of glass yarns, preferably a textile chosen from a knit, a ribbon, a braid or a woven fabric.

Preferably, the support is a woven fabric, preferably having a basis weight of greater than 50 g/m$^2$, preferably greater than 100 g/m$^2$, preferably greater than 200 g/m$^2$.

More than 90%, preferably more than 95%, by number of the yarns of the assembly may in particular be in accordance with one or more of the two variants of the third embodiment and/or be glass yarns, in particular according to the prior art.

All or some of the yarns of the assembly may themselves be heat-resistant products according to the invention. Preferably, more than 85%, preferably more than 90%, preferably more than 95%, preferably 100% by number of the yarns are heat-resistant products according to the invention. In one embodiment, the assembly comprises, over more than 85%, preferably more than 90%, preferably more than 95% of the thickness of said assembly, yarns which themselves are heat-resistant products according to the invention.

In one particular embodiment, the support is an optical fiber, preferably having a length of greater than 10 mm, preferably greater than 50 mm, preferably greater than 100 mm and/or an equivalent diameter, measured at mid-length, of greater than 30 μm, preferably greater than 40 μm, or even greater than 50 μm, or even greater than 80 μm, or even greater than 100 μm and/or preferably less than 300 μm, preferably less than 200 μm.

Preferably, the support (that is to say the fiber or the assembly of fibers) consists of a material comprising more than 95%, more than 98%, more than 99%, preferably 100%, oxides.

Said material is amorphous.

Said material preferably has an $SiO_2$ content of greater than or equal to 55%, as percentages by mass based on the oxides. Preferably, the $SiO_2$ content is greater than 60%, preferably greater than 65%, preferably greater than 70%, preferably greater than 75%, preferably greater than 80%, preferably greater than 85%, preferably greater than 90%, preferably greater than 92%, preferably greater than 94%, preferably greater than 96%, as percentages by mass based on the oxides.

In a preferred embodiment, said material has an $SiO_2$ content of greater than 99.5%, preferably greater than 99.9%, as percentages by mass based on the oxides. It may in particular consist of one or more Quartzel® yarns or fibers sold by the company Saint-Gobain Quartz.

In one embodiment, said material constituting the support has the following chemical analysis, as percentages by mass based on the oxides:

$SiO_2$ content: preferably greater than 90%, preferably greater than 92%, preferably greater than 94%, preferably greater than 95%, preferably greater than 96%, and preferably less than 99.9%, preferably less than 99.5%, and $Al_2O_3$ content: preferably greater than 0.1%, preferably greater than 0.2% and preferably less than 5%, preferably less than 4%, and content of oxides other than $SiO_2$ and $Al_2O_3$, which are preferably impurities: remainder to 100%, with preferably Na20 less than 0.3%, preferably less than 0.2%, and preferably K20 less than 0.3%, preferably less than 0.2%, and preferably MgO less than 0.3%, preferably less than 0.2%.

In one embodiment, said material constituting the support has the following chemical analysis, as percentages by mass based on the oxides:

$SiO_2$ content: preferably greater than 55% and preferably less than 79.9%, preferably less than 75%, preferably less than 70%, preferably less than 66%, and $Al_2O_3$ content: preferably greater than 12.5%, preferably greater than 15%, preferably greater than 20%, preferably greater than 24% and preferably less than 32%, preferably less than 30%, preferably less than 27%, and MgO content: preferably greater than 4%, preferably greater than 7%, preferably greater than 9%, and preferably less than 20%, preferably less than 18%, preferably less than 16%, and content of oxides other than $SiO_2$, $Al_2O_3$ and MgO, which are preferably impurities: remainder to 100%.

Coating

Preferably, the coating has a mean thickness, measured after drying at 150° C. for 2 hours, of greater than 0.05 μm, preferably greater than 0.1 μm, preferably greater than 0.2 μm and less than 5 μm, preferably less than 4 μm, preferably less than 3 μm, preferably less than 2 μm, preferably less than 1 μm.

Preferably, the mass of the coating, measured after drying at 150° C. for 2 hours, based on the mass of the support, is greater than 3%, preferably greater than 5%, preferably greater than 8%, preferably greater than 9%, and preferably less than 50%, preferably less than 40%, preferably less than 30%, preferably less than 25%, preferably less than 22%, preferably less than 20%.

Preferably, when the support is a primary, secondary or tertiary assembly, more than 50% of the surface of more than 50%, preferably more than 60%, preferably more than 70% by number of the fibers or yarns of said assembly are covered by said coating.

Preferably, the protected zone covered by the coating represents more than 50%, more than 70%, preferably more than 90%, preferably 100% of the outer surface of the support. Preferably, more than 50%, preferably more than 60%, preferably more than 70%, or even more than 80%, and less than 90% of the outer surfaces of more than 30%, preferably more than 40%, preferably more than 50% by number of the fibers or yarns of said support are covered by said coating. Said outer surfaces of the fibers or yarns include the surfaces that are not outer surfaces of the assembly.

Preferably, more than 40%, preferably more than 50% of the outer surfaces of more than 80%, preferably more than 85%, preferably more than 90%, by number, of the fibers or yarns of said support are covered by said coating.

Protective Particles

Preferably, the surface covered by the protective particles represents more than 65%, preferably more than 70%, preferably more than 75% and/or less than 85% of the protected zone, as percentage by surface area, preferably more than 65%, preferably more than 70%, preferably more than 75% and/or less than 85% of the outer surface of the support, as percentage by surface area.

In the protected zone, the total surface area of the interstices between the protective particles and having a size of greater than 250 nm represents less than 50% of the protected zone not covered by the protective particles, as percentage by surface area, that is to say less than 50% of the total surface area of the interstices between the protective particles, as percentage by surface area.

Preferably, in the protected zone, the total surface area of the interstices between the protective particles and having a size of greater than 250 nm represents less than 40%, preferably less than 30%, preferably less than 20%, preferably less than 10% of the protected zone not covered by the protective particles, as percentage by surface area.

Preferably, the amount of protective particles, as percentage by mass based on the total mass of the coating, is greater than 29%, preferably greater than 40%, preferably greater than 50%, preferably greater than 60%, preferably greater than 70% and/or preferably less than 99.5%, preferably less than 99%, preferably less than 98%, preferably less than 97%.

Preferably, the protective particles have a mean size of greater than 10 nm, preferably greater than 20 nm, preferably greater than 25 nm and/or preferably less than 90 nm, preferably less than 80 nm, preferably less than 70 nm, preferably less than 60 nm, preferably less than 50 nm.

Preferably, the protective particles are chosen from particles comprising more than 96%, preferably more than 97%, preferably more than 98%, preferably more than 99%, preferably more than 99.5% by mass of $Al_2O_3$ and/or of $ZrO_2$. Preferably, the remainder after $Al_2O_3$ and $ZrO_2$ consists for more than 90%, preferably more than 95%, preferably more than 99% by mass of oxide(s).

In one embodiment, the protective particles are chosen from particles comprising more than 96%, preferably more than 97%, preferably more than 98%, preferably more than 99%, preferably more than 99.5% by mass of $Al_2O_3+ZrO_2$, and preferably the $Na_2O+K_2O$ content is less than 0.02%, preferably less than 0.01%, preferably less than 0.005%, as percentage by mass based on the mass of said protective particles.

In a preferred embodiment, the protective particles are chosen from particles comprising more than 95%, preferably more than 96%, preferably more than 97%, preferably more than 98%, preferably more than 99%, preferably more than 99.5% by mass of $Al_2O_3$, and preferably the $Na_2O+K_2O$ content is less than 0.02%, preferably less than 0.01%, preferably less than 0.005%, as percentage by mass based on the mass of said protective particles. Preferably, in said embodiment, said protective particles comprise amorphous alumina and/or corundum and/or transition aluminas. Preferably, in said embodiment, said protective particles consist for more than 95%, preferably more than 98%, preferably more than 99% of their mass of a mixture of amorphous alumina and transition alumina, said transition aluminas preferably being chosen from delta, gamma and theta aluminas.

In one embodiment, the protective particles are chosen from particles comprising more than 95%, preferably more than 96%, preferably more than 97%, preferably more than 98%, preferably more than 99%, preferably more than 99.5% by mass of $ZrO_2$, and preferably the $Na_2O+K_2O$ content is less than 0.02%, preferably less than 0.01%, preferably less than 0.005%, as percentage by mass based on the mass of said protective particles.

In one embodiment, the coating does not comprise a dry binder. In one embodiment, it consists of the protective particles. Surprisingly, the inventors have found that the presence of a binder is not essential for the adhesion of the protective particles. In this embodiment, however, an organic layer, described hereinafter, is preferably deposited on the coating.

In one embodiment, the coating consists of the protective particles and a dry binder.

Dry Binder

The dry binder results from the drying of the liquid binder used to disperse the protective particles.

Its function in particular is to improve the adhesion of the protective particles to the surface of the support.

Preferably, the dry binder comprises a film former, that is to say a constituent which, during the manufacture of the coating, contributes to the spreading of the suspension containing the protective particles on the surface of the support, in the form of a film, and/or a coupling agent.

The film former and/or the coupling agent are preferably organic constituents.

Preferably, the film former is chosen from epoxy resins, polyesters, polyvinyl acetates, polyvinyl alcohol, polyolefins, polyurethanes, starch and mixtures thereof.

Preferably, the amount of film former, as percentage by mass based on the mass of the coating, is greater than 0.3%, preferably greater than 0.5%, preferably greater than 1%, preferably greater than 1.5%, preferably greater than 1.8% and/or preferably less than 57%, preferably less than 50%, preferably less than 40%, preferably less than 40%, preferably less than 25%, preferably less than 20%, preferably less than 18%.

Preferably, the coupling agent is chosen from silanes, organic titanates, organic zirconates and mixtures thereof. Preferably, the coupling agent is a silane.

Preferably, the amount of coupling agent, as percentage by mass based on the mass of the coating, is greater than 0.1%, preferably greater than 0.2%, preferably greater than 0.4%, preferably greater than 0.6%, preferably greater than 0.8%, preferably greater than 1%, preferably greater than 1.2%, and/or preferably less than 35%, preferably less than 30%, preferably less than 25%, preferably less than 20%, preferably less than 18%.

In one embodiment, the dry binder contains a film former and a coupling agent. Preferably, at least in this embodiment, the amount of film former, as percentage by mass based on the coating, is greater than 0.3%, preferably greater than 0.5%, preferably greater than 1%, preferably greater than 1.5%, preferably greater than 1.8%, and/or preferably less than 57%, preferably less than 50%, preferably less than 40%, preferably less than 40%, preferably less than 25%, preferably less than 20%, preferably less than 18%, and the amount of coupling agent, as percentage by mass based on the mass of the coating, is greater than 0.1%, preferably greater than 0.2%, preferably greater than 0.4%, preferably greater than 0.6%, preferably greater than 0.8%, preferably greater than 1%, preferably greater than 1.2%, and/or preferably less than 35%, preferably less than 30%, preferably less than 25%, preferably less than 20%, preferably less than 18%.

In one embodiment, the coating does not comprise an organic constituent other than the film former and the coupling agent.

In another embodiment, the coating comprises an organic constituent other than the film former and the coupling agent.

In a preferred embodiment, the organic constituent other than the film former and the coupling agent is chosen from a lubricant, a surfactant, an emulsifier, a wetting agent and mixtures thereof, preferably from an ethylene-propylene copolymer, a polyethylene glycol ether, ethanolamides, aliphatic polyamines, ethoxylated amines, phenyl glycol ethers, imidazolines, alkylamides, polyethylene glycols, plant oils, fatty acid esters, ethoxylated fatty acids, ethoxylated alkylphenols, and mixtures thereof.

The amount of said organic constituent, as percentage by mass based on the mass of the coating, is preferably greater than 0.05%, preferably greater than 0.1%, preferably greater than 0.2%, preferably greater than 0.3% and/or preferably less than 34%, preferably less than 30%, preferably less than 25%, preferably less than 20%, preferably less than 15%, preferably less than 10%.

Organic Layer

The organic layer, which is optional, at least partially, and preferably completely, covers the coating, which is thus sandwiched between the support and the organic layer.

The organic layer comprises, or even consists of, one or more materials chosen from:

a polyvinyl alcohol (or PVA), a paraffin, a polytetrafluoroethylene (or PTFE), a polymethyl methacrylate (or PMMA), a polyurethane, a latex, a resin, preferably an epoxy resin, an organic material capable of constituting a dry binder of said coating, when the coating comprises a dry binder, preferably said dry binder.

The amount of organic layer is greater than 1%, preferably greater than 1.5%, and preferably less than 10%, preferably less than 8%, preferably less than 6%, preferably less than 4%, as percentage by mass based on the heat-resistant product.

The organic layer advantageously makes it possible to reduce the risks of mechanical damage to the support.

It is particularly useful when it is applied to fibers or yarns constituting heat-resistant products according to the invention and which are intended to be assembled, for example in the form of a woven fabric or a non-woven fabric. Specifically, it limits the breakage of said fibers and said yarns and/or the detachment of the protective particles from the surface of said fibers and said yarns.

The organic layer can also be applied to the only outer surface of a fiber assembly, in particular a secondary or tertiary assembly.

When the support is an assembly of fibers which has a generally planar shape, in particular in the form of a textile, the organic layer may be applied in particular to one large face or to both large faces of the support.

The organic layer also makes it possible to strengthen the adhesion of the protective particles to the surface of the support. In one embodiment, the coating does not comprise a dry binder, and an organic layer extends over at least a portion of the coating, preferably over all of the coating. In one embodiment, the coating comprises a dry binder and an organic layer extends over at least a portion of the coating, preferably over all of the coating. In one embodiment, the coating comprises a dry binder and no organic layer extends over the coating. In one embodiment, the coating does not comprise a dry binder and no organic layer extends over the coating.

Preferably, a single yarn according to the invention has an organic layer which extends over at least a portion of the coating, preferably over all of the coating of said single yarn, the fibers constituting said single yarn being at least partly, preferably entirely, fibers according to the invention, the coating of said fibers comprising a dry binder.

Preferably, an assembled yarn according to the invention has an organic layer which extends over at least a portion of the coating, preferably over all of the coating of said assembled yarn, the single yarns constituting said assembled yarn being at least partly, preferably entirely, single yarns as described in the immediately preceding paragraph.

Preferably, a textile of single and/or assembled yarns according to the invention has a coating which does not comprise a dry binder and no organic layer extends over the coating, said single and/or assembled yarns being at least partly, preferably entirely, single and/or assembled yarns as described in the two immediately preceding paragraphs.

Manufacturing Process

The heat-resistant product according to the invention can be obtained by the manufacturing process comprising the following steps 1) to 3):

1) preparing the support and a suspension comprising, and preferably consisting of, a liquid binder and the protective particles;
2) applying said suspension to the support;
3) drying so as to transform the suspension into a coating having a solid form.

In step 1), the support and the suspension are prepared.

Support

The process does not modify the support. The description thereof above, and in particular the description of the type of support, of the structure of the fibers, in particular the diameter or the length of the fibers, of the composition of the fibers, of the number of fibers, or generally, of the dimensions of the support (length, width, thickness)

is therefore applicable to the support to which the suspension is applied.

Preferably, the support does not undergo any pretreatment for promoting the subsequent attachment of the coating.

Suspension

The suspension can be produced by mixing the liquid binder and the protective particles. Any conventional mixing techniques may be employed.

Preferably, when multiple organic constituents form part of the composition of the liquid binder, said organic constituents are mixed with one another, preferably with the solvent, and then the protective particles are introduced, the mixing continuing so as to obtain the suspension.

Protective Particles

The process does not substantially modify the protective particles. The description thereof above and in particular the description of the composition and of the particle size distribution of the protective particles is therefore applicable to the support and to the protective particles in the suspension.

Preferably, the amount of protective particles is greater than 7%, preferably greater than 10%, preferably greater than 15% and/or preferably less than 60%, preferably less than 50%, preferably less than 40%, preferably less than 30%, preferably less than 25%, by mass based on the mass of the suspension.

The application of a suspension of protective particles to the outer surface of the support, rather than a composition comprising precursors of the protective particles, i.e. a composition that generates the protective particles during the manufacture of the heat-resistant product, is necessary to avoid more than 90% of the protected zone (to which the suspension has been applied) being covered by the protective particles. A sol-gel process is therefore not suitable.

Liquid Binder

A function of the liquid binder is to facilitate the dispersion of the protective particles in the coating and to improve the adhesion of the protective particles to the surface of the support.

The liquid binder consists of the constituents which constitute the dry binder in the heat-resistant product, and of a solvent which is substantially removed in step 3), the solvent content after step 3) being preferably less than 5%, preferably less than 4%, preferably less than 3%, preferably less than 2%, preferably less than 1%.

The composition of the liquid binder excluding the solvent is therefore identical to that of the dry binder described above. The description of the composition of the dry binder above, and in particular the description of the nature of the film former, the nature of the coupling agent, the nature of the organic constituent other than the film former and/or the coupling agent, is therefore applicable to the liquid binder excluding the solvent.

The liquid binder comprises a liquid phase enabling the protective particles to be suspended. The liquid phase can consist of the constituents which constitute the dry binder in the heat-resistant product, and/or the solvent. These constituents or the solvent may therefore be absent, but not simultaneously.

Preferably, the amount of film former, as percentage by mass based on the mass of the liquid binder, is greater than 0.5%, preferably greater than 0.6% and/or preferably less than 10%, preferably less than 9%, preferably less than 8%, preferably less than 7%, preferably less than 6%, preferably less than 5%, preferably less than 4%.

Preferably, the amount of coupling agent, as percentage by mass based on the mass of the liquid binder, is greater than 0.2%, preferably greater than 0.3%, preferably greater than 0.4%, and/or preferably less than 4%, preferably less than 3%, preferably less than 2%, preferably less than 1%.

In one embodiment, the liquid binder contains a film former and a coupling agent. Preferably, in this embodiment, the amount of film former, as percentage by mass based on the mass of the liquid binder, is greater than 0.5%, preferably greater than 0.6% and/or preferably less than 10%, preferably less than 9%, preferably less than 8%, preferably less than 7%, preferably less than 6%, preferably less than 5%, preferably less than 4%, and the amount of coupling agent, as percentage by mass based on the mass of the liquid binder, is greater than 0.2%, preferably greater than 0.3%, preferably greater than 0.4%, and/or preferably less than 4%, preferably less than 3%, preferably less than 2%, preferably less than 1%. More preferably, at least in this embodiment, the coupling agent is a silane, and the film former is chosen from epoxy resins, polyesters, polyvinyl acetates, polyvinyl alcohol, polyolefins, polyurethanes, starch and mixtures thereof.

In one embodiment, the liquid binder excluding solvent does not comprise an organic constituent other than the film former and the coupling agent.

In another embodiment, the liquid binder excluding solvent comprises an organic constituent other than the film former and the coupling agent.

Said organic constituent is preferably chosen from a lubricant, a surfactant, an emulsifier, a wetting agent and mixtures thereof. These agents are used for the functions that they have in the technical field of fiber manufacture, in particular sizing. The person skilled in the art knows how to determine the natures and amounts thereof.

In one embodiment, the amount of said organic constituent, as percentage by mass based on the mass of the liquid binder, is greater than 0.05% and/or preferably less than 4%, preferably less than 3%, preferably less than 2%.

The liquid binder preferably comprises one said solvent, in particular if the organic constituents are in a solid form.

In one embodiment, the liquid binder consists of the solvent.

The solvent is preferably water. It enables the dissolution or the formation of an emulsion of the solid organic components, but also the reduction of the viscosity of the suspension, such that it can be effectively applied to the support.

The amount of solvent is preferably greater than 82%, preferably greater than 85%, preferably greater than 90%, preferably greater than 93% and/or preferably less than 99.8%, preferably less than 99.5%, preferably less than 99%, as percentage by mass based on the mass of the liquid binder.

In a preferred embodiment, the amount of solvent, preferably water, is greater than 39%, preferably greater than 40%, preferably greater than 50%, preferably greater than 60%, preferably greater than 70% and/or preferably less than 92%, preferably less than 90%, preferably less than 85%, as percentage by mass based on the mass of the suspension.

Preferably, in the suspension, the remainder to 100% after the solvent consists of the dry binder and the protective particles.

In step 2), the suspension is applied to the support.

In particular when the support is an assembly of fibers or yarns, the suspension can be applied to the support by impregnation. The impregnation may be carried out according to any technique known to the person skilled in the art, in particular by doctoring (or "doctor blade" process), by a tape casting process, by immersion (for example according to the dip coating process), by gun, by brush or by screen printing.

The person skilled in the art knows how to adapt the suspension, and in particular its viscosity, as a function of the mode of application, so that it penetrates within an assembly of fibers or yarns and impregnates it.

In the case where the support is an assembly of fibers or yarns, impregnation also advantageously makes it possible to coat the surfaces of said fibers or said yarns which are not exposed to the outside of the support, that is to say to not limit the coating to the outer surface of the support. In other words, an impregnation allows the application of a coating into the depth of the support. The extent of this coating is considerably increased. In this case, the coating therefore extends into the thickness of the support.

In one embodiment, in particular when the support consists of a superposition of several woven fabrics, each woven fabric is individually impregnated before being superimposed on the other impregnated woven fabrics.

In the case where the support is an assembly of fibers or yarns, preferably, the suspension penetrates into said support over more than 70%, preferably over more than 80%, preferably over more than 85%, preferably more than 90% of the thickness of said support.

Preferably, in the case where the support is an assembly of fibers or yarns:

more than 30%, preferably more than 40%, preferably more than 50%, by number of the fibers or yarns of said support are covered, for more than 50%, preferably for more than 60%, preferably for more than 70%, or even for more than 80%, and for less than 90% of their outer surfaces, with suspension, and/or more than 80%, preferably more than 85%, preferably more than 90%, by number of the fibers or yarns of said support are covered, for more than 40%, preferably for more than 50% of their outer surfaces, with suspension.

Preferably, the amount of suspension applied is adjusted such that the coating, after drying at 60° C. for 12 hours, has a mean thickness of greater than 0.05 μm, preferably greater than 0.1 μm, preferably greater than 0.2 μm and less than 5 μm, preferably less than 4 μm, preferably less than 3 μm, preferably less than 2 μm, preferably less than 1 μm. The adjustment can in particular result from an adaptation of the viscosity of the suspension with the solvent.

Preferably, the amount of suspension applied is adjusted such that the mass of the coating, based on the mass of the heat-resistant product, after drying at 60° C. for 12 hours, is greater than 3%, preferably greater than 5%, preferably greater than 8%, preferably greater than 9%, and preferably less than 25%, preferably less than 22%, preferably less than 20%.

In step 3), the suspension is dried. Any conventional drying techniques may be employed.

The drying is adapted so as to reduce the content of solvent, in particular of water, in the suspension in order to transform the suspension into a coating having a solid form. In particular, when present, the liquid binder is transformed into a dry binder.

Preferably, the content of solvent, in particular of water, in the coating, or even in the dry binder, is less than 5%, preferably less than 4%, preferably less than 3%, preferably less than 2%, preferably less than 1%.

Preferably, the drying is effected in a drying oven.

Preferably, the drying is effected at a temperature of greater than 40° C., preferably greater than 50° C. and/or preferably of less than 80° C., preferably less than 70° C. A drying temperature equal to 60° C. is highly suitable.

The duration of holding at the maximum temperature during the drying is preferably greater than 2 hours, preferably greater than 5 hours, preferably greater than 10 hours and/or preferably less than 24 hours, preferably less than 20 hours. A duration of holding at the maximum temperature during the drying of equal to 12 hours is highly suitable.

In one embodiment, at the end of step 2) and/or after step 3), preferably after step 3), a liquid precursor of the organic layer, of the type described above, is applied to the heat-resistant product in accordance with any known technique. By drying, preferably under the conditions described in step 3), said precursor is transformed into said organic layer.

Applications

The heat-resistant product according to the invention can be used in an application in which it is subjected to a temperature of greater than 400° C., greater than 500° C., greater than 600° C., greater than 700° C., greater than 800° C., or even greater than 900° C., for a duration of greater than 0.5 hours, preferably greater than 1 hour, preferably greater than 10 hours, preferably greater than 50 hours, preferably greater than 100 hours.

In particular, the heat-resistant product can be used:
as a heat shield, in particular
of a drive shaft, in particular of a land vehicle, aircraft or helicopter engine,
of an engine attachment harness, of an insulation element of an engine, in particular a
casing, of an actuating cylinder, of a pipe, of a system for attachment of said pipe, of a cable, in particular an electric cable and a thermo-
couple cable, of a conveying roller, in particular for conveying glass
sheets, of a system for attaching and driving said rollers, of a nacelle of an engine, in particular of a nacelle of
an aircraft engine, of an engine, in particular a land vehicle, aircraft,
helicopter and space rocket engine, of a suspension structure of an engine, in particular the
struts of an aircraft or helicopter engine, of a thrust reverser, in particular in an aircraft engine, of a fluid supply element of an engine, in particular a
space rocket engine, of a tube in which a fluid circulates, in particular a heat
transfer fluid, in particular in a reactor, of a seal, of a valve;

as sensors, in particular for high temperatures, in particular
when the support is an optical fiber, preferably incorporating
at least one Bragg grating.

EXAMPLES

The following non-limiting examples are given for the
purpose of illustrating the invention.

Tensile Breaking Force

The tensile breaking force of the examples, after exposure
to a temperature equal to 800° C. for 100 hours or after
exposure to a temperature equal to 1000° C. for 1 hour, in
an electric furnace under air, is determined in accordance
with the standard NF ISO 4606, on type II test specimens,
at an ambient temperature equal to 22° C., modified in the
following respects:

the rate of elongation is constant and is equal to 20
mm/min, the gauge length of the test specimen is equal to 200 mm, the width of the frayed test specimen is equal to 50 mm, the test specimens are stressed in the direction of the weft
yarns, the breaking force is measured in the direction of the weft
yarns, 3 test specimens of each example are tested, and the value
of the breaking force is the arithmetic mean of the 3
measurements taken.

Mass of the Coating

The support is weighed before application of the suspen-
sion (mass m1), and then weighed after application of the
suspension and drying at 150° C. for 2 hours (mass m2). The
mass of the coating is the difference m2-m1. It is provided
as a percentage by mass based on the mass of the heat-
resistant product.

Chemical Analysis

The chemical analysis of the protective particles and of
the yarns is measured by inductively coupled plasma (ICP)
spectrometry for the elements with a content not exceeding 0.5%. In order to determine the content of the other ele-
ments, a bead of the product to be analyzed is manufactured
by melting the product (protective particles or yarns), and
then the chemical analysis is carried out by X-ray fluores-
cence.

Surface Area of the Protected Zone Covered by the Protective Particles

The surface area of the protected zone covered by the
protective particles is measured by the following method.
After drying at 150° C. for 2 hours, images of the protected
surface are taken using a scanning electron microscope, such
that each image is a rectangular image making it possible to
observe a surface area of the protected zone of between 200
$\mu m^2$ and 500 $\mu m^2$. For each example, 10 images are thus
taken.

For each example, using the ImageJ image processing
software, the surface area of the observed protected zone
SZPi, and the surface area of the protected zone covered by
the protective particles SPi are calculated for each of the
images i. The total observed protected zone surface area
SZPT is equal to the sum of the surface area of the observed
protected zone, SZPi, in each of the images i. The total
surface area of the protected zone covered by the protective
particles SPT is equal to the sum of the surface area of the
protected zone covered by the protective particles SPi, in
each of the images i. The surface area of the protected zone
covered by the protective particles, expressed as percentage,
is equal to SPT/SZPT.

Mean Size of the Protective Particles

The mean size of the protective particles is measured by
the following method. After drying at 150° C. for 2 hours,
images of the protected surface are taken using a scanning
electron microscope, such that each image contains between
20 and 100 protective particles. The number of images taken
is such that the total number of protective particles is
between 150 and 250. In each image, the size of each
protective particle is estimated via the largest dimension of
said particle in said image. The mean size of the protective
particles is equal to the arithmetic mean of the observed
protective particle sizes.

Manufacturing Protocol

The following starting substances are used:

in example 2, as protective particle powder, a TM-DAR
Taimicron alumina powder sold by the company Krahn
Chemie GmbH, having a content by mass of
$Al_2O_3 > 99.9\%$;

in example 3, the protective particles are fumed alumina
particles, provided in the form of a Cab-O-Sperse® PG
003 suspension sold by the company Cabot, the sus-
pended particles having a content by mass of
$Al2O_3 > 99.7\%$;

in example 4, the protective particles are zirconia par-
ticles, provided in the form of a suspension comprising
9.8% by mass of particles, said suspended particles
having a mean size equal to 38 nm and a content by
mass of $ZrO_2 + HfO_2 \geq 99.5\%$;

in examples 2 and 3, as coupling agent, the silane A1100
sold by the company Momentive;

in examples 1 to 4, as support, a ⅕ satin fabric made of
Quartzel® yarns having a basis weight equal to 600 g/m², said yarns bearing the reference C14 80 Z20 QS1318 and being sold by the company Saint-Gobain Quartz.

Example 2, outside of the invention, is manufactured according to the following process.

In step 1), first, 3.3 g of silane A1100 and 411.7 g of demineralized water are mixed in a mixer. The total mixing time is equal to 30 minutes.

Then, to mix the protective particles, the mixture of silane A1100 and water, 85 g of TM-DAR alumina powder and 1000 g of a powder of alumina beads having a median size equal to 6 mm are placed in a jar having a volume of 1 liter. The jar is closed and then set in rotation on a jar mill at a speed of rotation equal to 50 rpm for 12 hours. The beads are then removed.

The suspension thus obtained has the composition described in table 1 below.

TABLE 1

| Constituents | % by mass, based on the mass of the suspension |
|---|---|
| Powder of TM-DAR alumina particles | 17 |
| Silane A1100 | 0.7 |
| Demineralized water | 82.3 |

In step 2), the satin fabric is soaked in a bath of the suspension produced in step 1), for 5 seconds.

The satin fabric is then removed from the bath, and the surplus suspension is drained off vertically.

In step 3), the satin fabric obtained at the end of step 2) is dried in a drying oven at 60° C., the duration of holding at this temperature being equal to 12 hours.

After said drying, a heat-resistant product is obtained.

The coating of said heat-resistant product has the composition described in table 2 below.

TABLE 2

| Constituents | % by mass, based on the mass of the coating |
|---|---|
| Powder of TM-DAR alumina particles | 96.0 |
| Silane A1100 | 4.0 |

In the heat-resistant product of example 2:

the protected zone represents 100% of the outer surface area of the satin fabric;

the protective particles cover 98% of the protected zone, as percentage by surface area;

the mean size of the protective particles is equal to 295 nm.

Example 3, according to the invention, is manufactured according to the following process.

In step 1), first, 3.3 g of silane A1100 and 284.2 g of demineralized water are mixed in a mixer. The total mixing time is equal to 30 minutes.

212.5 g of Cab-O-Sperse® PG 003 suspension are then added. Mixing is continued for a further 30 minutes.

The suspension thus obtained has the composition described in table 3 below.

TABLE 3

| Constituents | % by mass, based on the mass of the suspension |
|---|---|
| Powder of alumina particles | 17 |
| Silane A1100 | 0.7 |
| Demineralized water | 82.3 |

In step 2), the satin fabric is soaked in a bath of the suspension produced in step 1), for 5 seconds. The satin fabric is then removed from the bath, and the surplus suspension is drained off vertically.

In step 3), the satin fabric obtained at the end of step 2) is dried in a drying oven at 60° C., the duration of holding at this temperature being equal to 12 hours.

After said drying, a heat-resistant product is obtained.

The coating of said heat-resistant product has the composition described in table 4 below.

TABLE 4

| Constituents | % by mass, based on the mass of the coating |
|---|---|
| Powder of alumina particles | 96.0 |
| Silane A1100 | 4.0 |

In the heat-resistant product of example 3:

the mass of the coating is equal to 11%, as percentage by mass based on the mass of the heat-resistant product;

the protected zone represents 100% of the outer surface area of the satin fabric;

the protective particles cover 85% of the protected zone, as percentage by surface area;

the mean size of the protective particles is equal to 58 nm.

Example 4, according to the invention, is manufactured according to the following process.

In step 1), 500 ml of the zirconia suspension and 1000 g of a powder of zirconia beads having a median size equal to 6 mm are placed in a jar having a volume of 1 liter. The jar is closed and then set in rotation on a jar mill at a speed of rotation equal to 50 rpm for 12 hours. The beads are then removed.

The suspension thus obtained has the composition described in table 5 below.

TABLE 5

| Constituents | % by mass, based on the mass of the suspension |
|---|---|
| Powder of zirconia particles | 9.8 |
| Water | 90.2 |

In step 2), the satin fabric is soaked in a bath of the suspension produced in step 1), for 5 seconds. The satin fabric is then removed from the bath, and the surplus suspension is drained off vertically.

In step 3), the satin fabric obtained at the end of step 2) is dried in a drying oven at 60° C., the duration of holding at this temperature being equal to 12 hours.

After said drying, a heat-resistant product is obtained.

The coating of said heat-resistant product has the composition described in table 6 below.

TABLE 6

| Constituents | % by mass, based on the mass of the coating |
|---|---|
| Powder of zirconia particles | 100 |

In the heat-resistant product of example 4:

the mass of the coating is equal to 3%, as percentage by mass based on the mass of the heat-resistant product;

the protected zone represents 100% of the outer surface area of the satin fabric;

the protective particles cover 71% of the protected zone, as percentage by surface area;

the mean size of the protective particles is less than 40 nm.

Results

The results obtained are summarized in tables 7 and 8 below.

The support of comparative example 1 is identical to that of examples 2, 3 and 4. However, the support of example 1 has no coating, unlike the supports of examples 2, 3 and 4.

TABLE 7

| | Example | | |
| --- | --- | --- | --- |
| | 1 | 2 | 3 |
| Breaking force (N/5 cm) after exposure to 800° C. for 100 hours | 416 | 451 | 652 |

The heat-resistant product of example 3, according to the invention, has a tensile breaking force, after exposure to 800° C. for 100 hours, equal to 652 N/5 cm, 57% higher than that of the support of comparative example 1 (416 N/5 cm), and 45% higher than that of the support of comparative example 2 (451 N/5 cm).

TABLE 8

| | Example | | | |
| --- | --- | --- | --- | --- |
| | 1 | 2 | 3 | 4 |
| Breaking force (N/5 cm) after exposure to 1000° C. for 1 hour | 233 | 500 | 642 | 701 |

The heat-resistant product of example 3, according to the invention, has a tensile breaking force, after exposure to 1000° C. for 1 hour, equal to 642 N/5 cm, 2.76 times higher than that of the support of comparative example 1 (233 N/5 cm), and 1.28 times higher than that of the support of comparative example 2 (500 N/5 cm).

The heat-resistant product of example 4, according to the invention, has a tensile breaking force, after exposure to 1000° C. for 1 hour, equal to 701 N/5 cm, 3 times higher than that of the support of comparative example 1 (233 N/5 cm), and 1.4 times higher than that of the support of comparative example 2 (500 N/5 cm).

As is now clearly apparent, the invention provides a heat-resistant product having an improved service life, by virtue of a remarkable improvement in the mechanical properties at high temperatures, especially in the temperature range 400° C.-900° C.

Of course, the invention is not limited to the examples and embodiments described, which are provided by way of illustrative and non-limiting examples.

In particular, the products according to the invention are not limited to particular shapes or dimensions.

The invention claimed is:

1. A process in which a heat-resistant product having:

a support chosen from a glass fiber and an assembly of glass fibers, and a coating extending over the outer surface of said support, in a zone called the "protected zone", said coating comprising particles having a mean size of less than 100 nm and comprising more than 95% by mass of $Al_2O_3$ and/or $ZrO_2$, referred to as "protective particles", the protective particles covering more than 50% and less than 90% of the protected zone, as percentage by surface area, wherein said process comprises the step of subjecting said heat-resistant product to a temperature of greater than 600° C. for a duration of greater than 0.5 hours.

2. The process as claimed in claim 1, wherein the support is in the form of an optical fiber, a single yarn, an assembled yarn, a felt, a web, a knit, a ribbon, a braid or a woven fabric.

3. The process as claimed in claim 2, wherein the support is in the form of a woven fabric including a network of parallel warp yarns and weft yarns transversely crossing said network, at least some of the warp and/or weft yarns being heat-resistant products as claimed in either of the preceding claims.

4. The process as claimed in claim 1, wherein the glass fibers constituting the support is a material having an $SiO_2$ content of greater than or equal to 55%, as percentage by mass based on the oxides.

5. The process as claimed in claim 4, wherein the glass fibers constituting the support is a material having, as percentages by mass based on the oxides:

an $SiO_2$ content of greater than 90% and an $Al_2O_3$ content of greater than 0.1% and less than 5%, oxides other than $SiO_2$ and $Al_2O_3$ constituting the remainder to 100%, or an $SiO_2$ content of less than 79.9%, an $Al_2O_3$ content of greater than 12.5% and less than 32%, and an MgO content of greater than 4% and less than 20%, oxides other than $SiO_2$, $Al_2O_3$ and MgO constituting the remainder to 100%, or an $SiO_2$ content of greater than 99.9%.

6. The process as claimed in claim 1, wherein the total surface area of the interstices present in the protected zone between the protective particles and having a size of greater than 250 nm represents less than 50% of the total surface area of the interstices of said protected zone, as percentage by surface area.

7. The process as claimed in claim 1, wherein the protected zone represents more than 50% of the outer surface area of the support.

8. The process as claimed in claim 1, wherein the protective particles cover more than 75% and/or less than 85% of the protected zone, as percentage by surface area.

9. The process as claimed in claim 1, wherein the coating comprises, as percentage by mass based on the total mass of the coating, more than 60% protective particles.

10. The process as claimed in claim 1, wherein the mean size of the protective particles is greater than 10 nm and less than 70 nm.

11. The process as claimed in claim 1, wherein the coating comprises a dry binder comprising an organic film former in an amount, as percentage by mass based on the mass of the coating, of greater than 0.3% and less than 57%, and/or an organic coupling agent in an amount, as percentage by mass based on the mass of the coating, of greater than 0.1% and less than 35%, and/or an organic constituent other than the film former and the coupling agent and chosen from a lubricant, a surfactant, an emulsifier, a wetting agent and mixtures thereof, in an amount, as percentage by mass based on the mass of the coating, of greater than 0.05% and less than 34%.

12. The process as claimed in claim 1, the heat-resistant product comprising a layer at least partially covering the coating, said layer comprising one or more materials chosen from:

a polyvinyl alcohol, a paraffin, a polytetrafluoroethylene, a polymethyl methacrylate, a polyurethane, a latex, a resin, an organic material capable of constituting a dry binder of said coating, when the coating comprises a dry binder.

13. The process as claimed in claim 1, wherein the heat-resistant product is manufactured according to a process comprising the following steps 1) to 3):

1) preparing the support and a suspension comprising a liquid binder and the protective particles;

2) applying said suspension to the support;

3) drying so as to transform the suspension into a coating having a solid form.

14. The process as claimed in claim 1, wherein the heat-resistant product is disposed so as to serve as a heat shield, in particular of a drive shaft, of an engine attachment harness, of an insulation element of an engine of an actuating cylinder, of a pipe, of a system for attachment of said pipe, of a cable, of a conveying roller, of a system for attaching and driving said rollers, of a nacelle of an engine, of an engine, of a suspension structure of an engine of a thrust reverser of a fluid supply element of an engine of a tube in which a fluid circulates of a seal, of a valve;

as a sensor, the support being an optical fiber.

15. The process as claimed in claim 14, wherein the drive shaft is a drive shaft of a land vehicle, aircraft or helicopter engine, the insulation element is an insulation casing of an engine, the cable is an electric cable or a thermocouple cable, the conveying roller is for conveying glass sheets, the nacelle is a nacelle of an aircraft engine, the heat-resistant product is disposed so as to serve as a heat shield of an engine in a land vehicle, aircraft, helicopter or space rocket engine, the suspension structure is struts of an aircraft or helicopter engine, the thrust reverser is a thrust reverser in an aircraft engine, the fluid supply element of a space rocket engine, the tube is a tube in which a heat transfer fluid circulates in a reactor, the optical fiber incorporates at least one Bragg grating.

\* \* \* \* \*